(12) United States Patent
Inuo et al.

(10) Patent No.: US 9,021,234 B2
(45) Date of Patent: Apr. 28, 2015

(54) INDIRECT DESIGNATION OF PHYSICAL CONFIGURATION NUMBER AS LOGICAL CONFIGURATION NUMBER BASED ON CORRELATION INFORMATION, WITHIN PARALLEL COMPUTING

(75) Inventors: Takeshi Inuo, Tokyo (JP); Kengo Nishino, Tokyo (JP); Nobuki Kajihara, Tokyo (JP)

(73) Assignee: NEC Corporation, Tokyo (JP)

( * ) Notice: Subject to any disclaimer, the term of this patent is extended or adjusted under 35 U.S.C. 154(b) by 982 days.

(21) Appl. No.: 13/140,850

(22) PCT Filed: Dec. 25, 2009

(86) PCT No.: PCT/JP2009/071636
§ 371 (c)(1),
(2), (4) Date: Jun. 20, 2011

(87) PCT Pub. No.: WO2010/087098
PCT Pub. Date: Aug. 5, 2010

(65) Prior Publication Data
US 2011/0320769 A1 Dec. 29, 2011

(30) Foreign Application Priority Data
Jan. 30, 2009 (JP) ................................ 2009-019561

(51) Int. Cl.
*G06F 9/38* (2006.01)

(52) U.S. Cl.
CPC .................................... *G06F 9/3897* (2013.01)

(58) Field of Classification Search
CPC .................................... G06F 9/00; G06F 15/76
See application file for complete search history.

(56) References Cited

U.S. PATENT DOCUMENTS

| | | | | |
|---|---|---|---|---|
| 6,560,671 B1 * | 5/2003 | Samra et al. | ............... | 711/108 |
| 7,003,660 B2 * | 2/2006 | Vorbach et al. | ............... | 713/100 |
| 7,174,443 B1 * | 2/2007 | Vorbach et al. | ............... | 712/229 |

FOREIGN PATENT DOCUMENTS

| | | |
|---|---|---|
| JP | 3269526 B | 3/2002 |
| JP | 2003067183 A | 3/2003 |

(Continued)

OTHER PUBLICATIONS

International Search Report for PCT/JP2009071636 mailed Mar. 30, 2010.

*Primary Examiner* — Idriss N Alrobaye
*Assistant Examiner* — John Lindlof
(74) *Attorney, Agent, or Firm* — Sughrue Mion, PLLC

(57) ABSTRACT

A computing section is provided with a plurality of computing units and correlatively stores entries of configuration information that describes configurations of the plurality of computing units with physical configuration numbers that represent the entries of configuration information and executes a computation in a configuration corresponding to a designated physical configuration number. A status management section designates a physical configuration number corresponding to a status to which the computing section needs to advance the next time for the computing section and outputs the status to which the computing section needs to advance the next time as a logical status number that uniquely identifies the status to which the computing section needs to advance the next time in an object code. A determination section determines whether or not the computing section has stored an entry of configuration information corresponding to the status to which the computing section needs to advance the next time based on the logical status number that is output from the status management section. A rewriting section correlatively stores the entry of the configuration information and a physical configuration number corresponding to the entry of the configuration information in the computing section when the determination section determines that the computing section has not stored the entry of configuration information corresponding to the status to which the computing section needs to advance the next time.

9 Claims, 11 Drawing Sheets

(56) References Cited

FOREIGN PATENT DOCUMENTS

| | | |
|---|---|---|
| JP | 3444216 B | 9/2003 |
| JP | 2004133780 A | 4/2004 |
| JP | 3528922 B | 5/2004 |
| JP | 3576837 B | 10/2004 |
| JP | 3616518 B | 2/2005 |
| JP | 2005100448 A | 4/2005 |
| JP | 3674515 B | 7/2005 |
| JP | 2005222142 A | 8/2005 |
| JP | 2006018515 A | 1/2006 |
| JP | 2006351047 A | 12/2006 |
| JP | 3921367 B | 5/2007 |
| JP | 2007207136 A | 8/2007 |
| JP | 2008123545 A | 5/2008 |
| WO | 2007114059 A | 10/2007 |

* cited by examiner

Fig.7

Status transition table

| Current status number | Event 0 | | Event 1 | |
|---|---|---|---|---|
| | Next status number | Next configuration number | Next status number | Next configuration number |
| 0 | 1 | 0 | 1 | 1 |
| 1 | 2 | 1 | 3 | 2 |
| 2 | 2 | 1 | 3 | 2 |
| 3 | 3 | 2 | 1 | 0 |

Configuration number correlation table

| Status number | Configuration number |
|---|---|
| 0 | 1 |
| 1 | 0 |
| 2 | 1 |
| 3 | 2 |

Configuration information table

| Configuration number | Configuration information |
|---|---|
| 0 | Computation A |
| 1 | Computation B |
| 2 | Computation C |

Fig.8

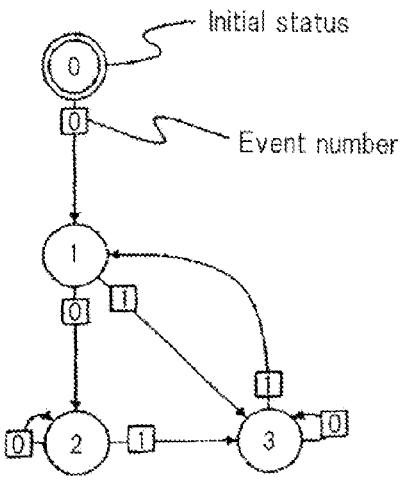

Fig.9

Logical/physical correlation information

Logical/physical status number correlation table

| Logical status number | Physical status number |
|---|---|
| 0 | 0 |
| 1 | 1 |
| 2 | 0 |
| 3 | 1 |

Logical/physical configuration number correlation information

| Logical configuration number | Physical configuration number |
|---|---|
| 0 | 0 |
| 1 | 0 |
| 2 | 1 |

Fig.10A

Logical status transition table

| | Event 0 | | | Event 0 | | |
|---|---|---|---|---|---|---|
| Current logical status number | Next logical status number | Next physical status number | Next physical configuration number | Next logical status number | Next physical status number | Next physical configuration number |
| 0 | 1 | 1 | 0 | - | - | - |
| 1 | 2 | 0 | 0 | 3 | 1 | 1 |
| 2 | 2 | 0 | 0 | 3 | 1 | 1 |
| 3 | 3 | 1 | 1 | 1 | 1 | 0 |

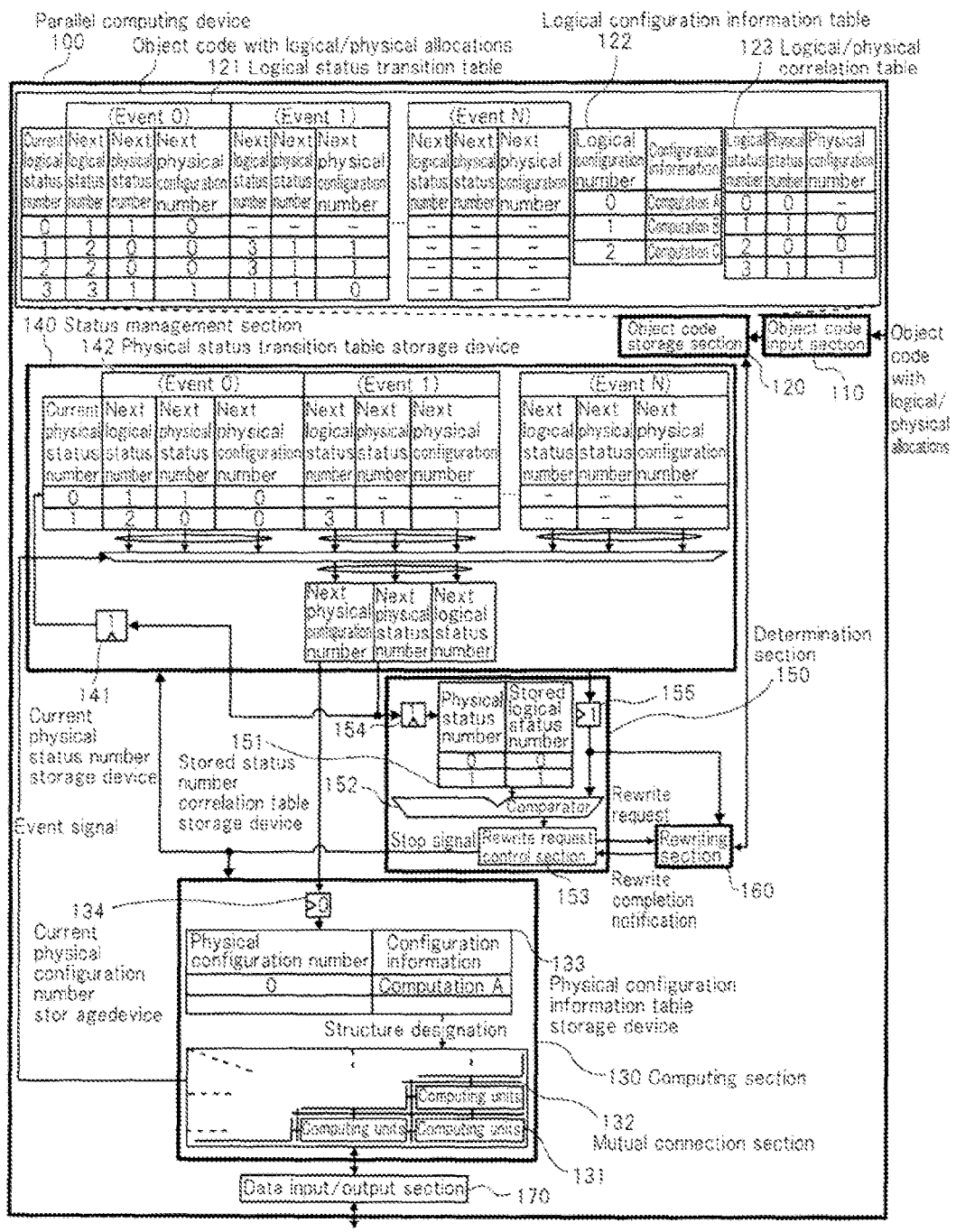

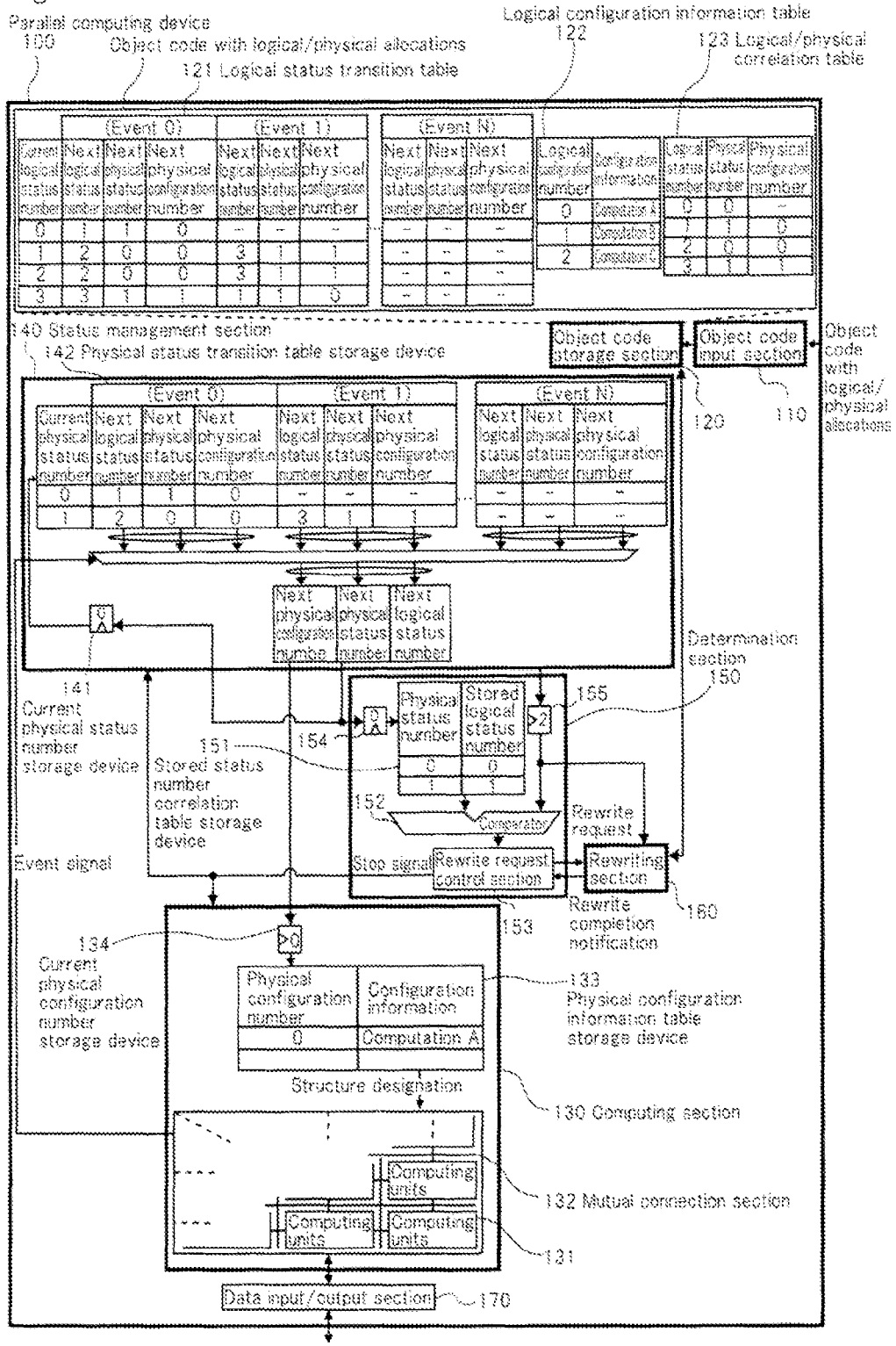

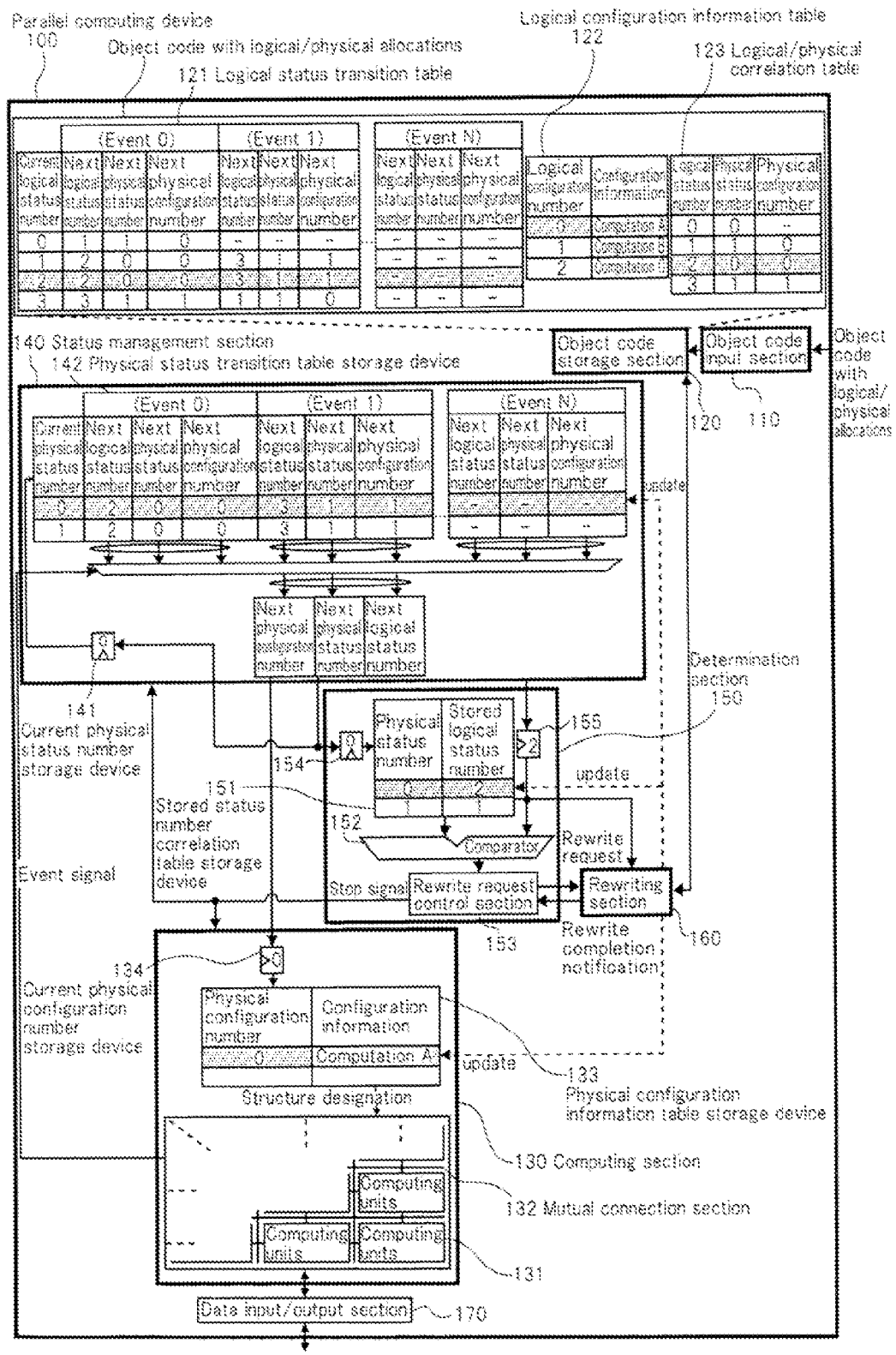

INDIRECT DESIGNATION OF PHYSICAL CONFIGURATION NUMBER AS LOGICAL CONFIGURATION NUMBER BASED ON CORRELATION INFORMATION, WITHIN PARALLEL COMPUTING

The present application is the National Phase of PCT/JP2009/071636, filed Dec. 25, 2009, which claims a priority based on Japanese Patent Application JP 2009-019561 filed on Jan. 30, 2009, the entire contents of which are incorporated herein by reference in its entirety.

TECHNICAL FIELD

The present invention relates to parallel computing devices that execute parallel processes while changing configurations of connections of a plurality of computing units.

BACKGROUND ART

As processor units that accomplish intended processes, CPUs (Central Processing Units) are known. Among them, parallel computing devices composed of array type processors in which a plurality of processors are arranged in an array shape for miniaturization and high performance (refer to Patent documents 1 to 6 that follow) are known. The related arts presented in these Patent documents are hereinafter referred to as the first related art.

A technique that generates a program that operates on a parallel computing device according to the first related art (this program is also referred to as an object code) is presented in the following Patent document 7. This program generation technique is hereinafter referred to as the second related art.

The parallel computing device according to the first related art executes a process based on an object code. The object code contains at least one entry of configuration information generated based on data to be processed. Configuration information is information that serves to virtually configure a circuit in a parallel computing device and is composed of computation instructions that are issued to individual computing units that accomplish parallel processes of the parallel computing device and information that represents relationships of connections of individual computing units.

Each entry of configuration information is stored in a memory of the parallel computing device and identified by a number assigned thereto (this number is hereinafter referred to as the configuration number). In the parallel computing device, virtual circuits are configured based on designated entries of configuration information and processes are executed by the circuit.

The first related art employs a technique in which a process is executed by directly designating the configuration number. For example, the configuration number that is an address of the memory is designated.

In addition, according to the first related art, the current status of the parallel computing device corresponds to an entry of configuration information that is currently being executed. Status numbers corresponding to individual configuration numbers stored in the parallel computing device have been defined and the entry of configuration information that is currently being executed is managed with a status number.

Moreover, the first related art employs a technique in which a next transition status number and a configuration number are selected from a status transition table.

The status transition table correlates a status number that represents an entry of configuration information that is currently being executed (this status number is hereinafter referred to as the current status number) with an event signal that is generated as a computation result by a circuit that is realized based on the entry of configuration information corresponding to the current status number so as to define a status number and a configuration number to be selected next. Referring to the status transition table, a status number and a configuration number to be selected next can be obtained based on the current status number and the event signal.

An object code is composed of both a plurality of entries of configuration information based on which the parallel computing device executes a intended process and the status transition table.

Generally, since a configuration number is defined for each object code, if a plurality of objects are tried to be installed to one parallel computing device according to the first related art, the configuration numbers of these object codes may overlap and thereby individual entries of configuration information cannot be uniquely identified.

In this case, if a plurality of object codes is converted into one object code, such overlaps may be prevented from occurring. However, if a plurality of object codes is converted into one object code such that configuration numbers do not overlap, the number of configuration numbers of the converted object code becomes the sum of the number of configuration numbers of individual object codes.

In the parallel computing device according to the first related art, each entry of configuration information stored in the parallel computing device is selected by directly designating a configuration number and thereby a large object code that uses configuration information whose number of entries exceeds the number that can be stored in the parallel computing device cannot be realized.

In contrast, a parallel computing device employing the technique disclosed in the following Patent document 8 has been proposed by the applicant of the present patent application. This technique will be hereinafter referred to as the third related art.

The parallel computing device according to the third related art employs a technique in which a configuration number is designated indirectly, not directly. In this related art, a number in which a configuration number is directly designated is referred to as a physical number, whereas a number in which a configuration number is indirectly designated is referred to as a logical number. According to the third related art, a configuration number is designated as a logical number and the logical number is converted into a physical number so as to identify an entry of configuration information.

Specifically, a logical number is contained in an object code, whereas a physical number is managed in the parallel computing device. More specifically, a configuration number contained in an object code is a logical configuration number. In addition, a configuration number managed in the parallel computing device such as a configuration number of an entry of configuration information that is currently being executed is a physical configuration number.

According to the third related art, since the parallel computing device is provided with means that converts a logical configuration number into a physical configuration number, configuration information whose number of entries exceeds those that can be stored in the parallel computing device can be designated as a logical number. As a result, large object codes can be used for the parallel computing device.

(PATENT DOCUMENTS)
Patent document 1: Japan Patent No. 3576837
Patent document 2: Japan Patent No. 3444216

Patent document 3: Japan Patent No. 3269526
Patent document 4: Japan Patent No. 3616518
Patent document 5: Japan Patent No. 3674515
Patent document 6: Japan Patent No. 3528922
Patent document 7: Japan Patent No. 3921367
Patent document 8: International Laid-Open No. WO 2007/114059A1

SUMMARY OF THE INVENTION

Problem to be Solved by the Invention

However, to arealize the means that converts a logical configuration number into a physical configuration number (this means is hereinafter referred to as the configuration number conversion section) in the parallel computing device according to the third related art, a special memory, for example, a CAM (Content Addressable Memory) becomes necessary.

A conventional memory inputs a memory address and outputs data corresponding to the address, whereas the memory called CAM inputs data and outputs an address corresponding to the input data.

Although the configuration number conversion section converts a logical number into a physical number, if the configuration number conversion section is realized by a conventional memory in which a logical number is designated as an address and a physical number is designated as data, the upper limit of the number of logical numbers depends on the number of entries to the memory. As a result, a logical number that exceeds the number of entries of the memory cannot be used for an object code. Thus, the parallel computing device according to the third related art needs to use such a special memory for the configuration number conversion section.

However, such a special memory involves a larger operational delay than does the conventional memory. As a result, since the parallel computing device according to the third related art causes the clock cycle to be long taking into consideration the operational delay that occurs in the configuration number conversion section, the speeding-up of the parallel computing device has been restricted.

An object of the present invention is to realize parallel computing devices that can use large object codes and that can operate at high speed.

Means that Solve the Problem

To realize the foregoing object, a parallel computing device according to the present invention comprises:
a computing section that is provided with a plurality of computing units and that correlatively stores entries of configuration information that describes configurations of the plurality of computing units with physical configuration numbers that represent the entries of configuration information and executes a computation in a configuration corresponding to a designated physical configuration number;
a status management section that designates a physical configuration number corresponding to a status to which said computing section needs to advance the next time for said computing section and outputs the status to which said computing section needs to advance the next time as a logical status number that uniquely identifies the status to which said computing section needs to advance the next time in an object code;
a determination section that determines whether or not said computing section has stored an entry of configuration information corresponding to the status to which said computing section needs to advance the next time based on said logical status number that is output from said status management section; and
a rewriting section that correlatively stores the entry of the configuration information and a physical configuration number corresponding to the entry of the configuration information to said computing section when said determination section determines that said computing section has not stored the entry of configuration information corresponding to said status to which said computing section needs to advance the next time.

An information processing system according to the present invention comprises:
a parallel computing device including:
a computing section that is provided with a plurality of computing units and that correlatively stores entries of configuration information that describes configurations of the plurality of computing units with physical configuration numbers that represent the entries of configuration information and executes a computation in a configuration corresponding to a designated physical configuration number; a status management section that designates a physical configuration number corresponding to a status to which said computing section needs to advance the next time for said computing section and outputs the status to which said computing section needs to advance the next time as a logical status number that uniquely identifies the status to which said computing section needs to advance the next time in an object code; a determination section that determines whether or not said computing section has stored an entry of configuration information corresponding to the status to which said computing section needs to advance the next time based on said logical status number that is output from said status management section; and a rewriting section that correlatively stores the entry of the configuration information and a physical configuration number corresponding to the entry of the configuration information to said computing section when said determination section determines that said computing section has not stored the entry of configuration information corresponding to said status to which said computing section needs to advance the next time; and
an information processing device that supplies said object code with logical/physical allocations to said parallel computing device,
wherein said information processing device generates a logical configuration information table that correlates said logical status number with said entry of configuration information, a logical/physical correlation table that correlates said logical status number with at least said physical configuration number, and an object code with logical/physical allocations that correlates a current logical status number with a next physical configuration number and a next logical status number,
wherein said status management section of said parallel computing device designates said physical configuration number and said logical status number corresponding to said status to which said computing section needs to advance the next time based on said object code with logical/physical allocations, and
wherein said rewriting section of said parallel computing device designates the entry of configuration information and the physical configuration number corresponding to the entry of the configuration information to be stored in said computing section based on the logical configuration information table and said logical/physical correlation table.

A parallel computing method according to the present invention is a parallel computing method for a parallel computing device that executes a process, said parallel computing device having a computing section that is provided with a plurality of computing units and that correlatively stores entries of configuration information that describes configurations of the plurality of computing units and physical configuration numbers that represent the entries of configuration information and executes a computation in a configuration corresponding to a designated physical configuration number, the parallel computing method comprising:

designating a physical configuration number corresponding to a status to which said computing section needs to advance the next time for said computing section and obtaining the status to which said computing section needs to advance the next time as a logical status number that uniquely identifies the status to which said computing section needs to advance the next time in an object code;

determining whether or not said computation section has stored an entry of configuration information corresponding to the status to which said computation section needs to advance the next time based on said logical status number that is obtained; and correlatively storing the entry of the configuration information and a physical configuration number corresponding to the entry of the configuration information to said computation section when determined that said computation section has not stored the entry of configuration information corresponding to said status to which said computation section needs to advance the next time.

BRIEF DESCRIPTION OF DRAWINGS

[FIG. 7] is a schematic diagram showing an example of an object code without logical/physical allocations supplied from data supply device 210.

[FIG. 8] is a schematic diagram showing a status transition in the object code without logical/physical allocations shown in FIG. 7.

[FIG. 9] is a diagram showing an example of logical/physical correlation information supplied from data supply device 210.

[FIG. 10A] is a diagram showing a logical status transition table of an object code with logical/physical allocations.

[FIG. 10B] is a diagram showing a logical/physical correlation table of an object code with logical/physical allocations.

[FIG. 11] is a schematic diagram showing a status of parallel computation device 100 immediately after the execution from logical status 0 to logical status 1 of the object code with logical/physical allocations shown in FIG. 10B.

[FIG. 12] is a schematic diagram showing a status of parallel computation device 100 at the next clock cycle of FIG. 11.

[FIG. 13] is a schematic diagram showing a status of parallel computation device 100 after the operation of rewriting section 160.

BEST MODES THAT CARRY OUT THE INVENTION

With reference to drawings, exemplary embodiments of the present invention will be described in detail.

(First Exemplary Embodiment)

A first exemplary embodiment of the present invention exemplifies a parallel computation device having a basic structure according to the present invention.

Figure 1:
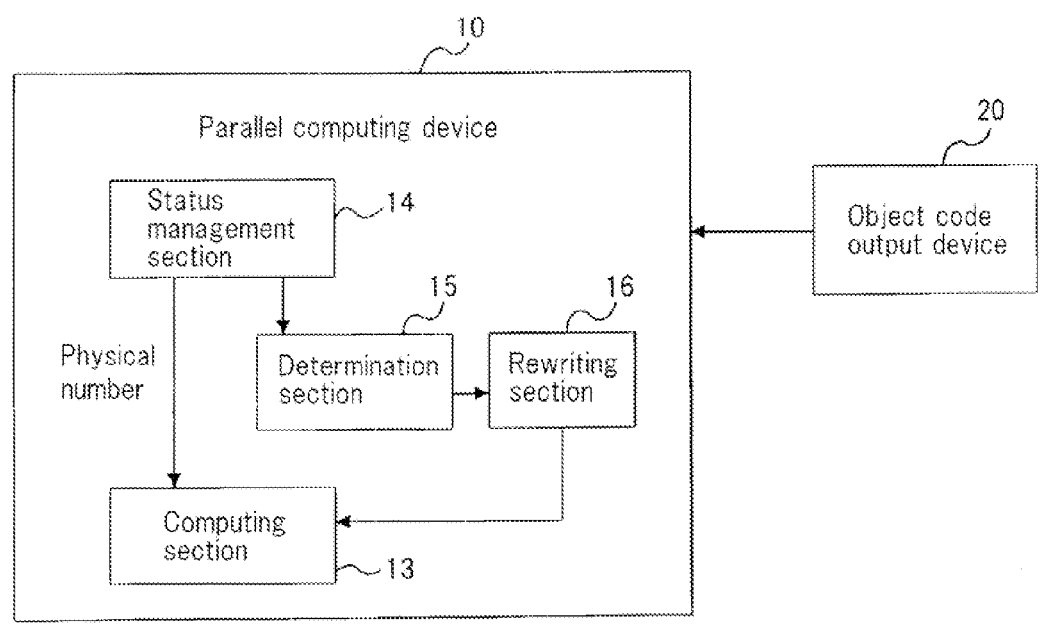
[FIG. 1] is a block diagram showing a structure of a parallel computation device according to a first exemplary embodiment.

FIG. 1 is a block diagram showing a structure of the parallel computation device according to the first exemplary embodiment. Referring to FIG. 1, parallel computation device 10 has computation section 13, status management section 14, determination section 15, and rewriting section 16. Object code output device 20 supplies an object code to parallel computation device 10. Parallel computation device 10 executes a process according to the supplied object code.

Computation section 13 is a computation section that is provided with a plurality of computation units arranged in an array shape and that executes a process while changing connections of the computing units. Computing section 13 correlatively stores entries of configuration information that represent configurations of connections of the plurality of computing units with physical configuration numbers that identify the entries of configuration information and when a physical configuration number is designated, computing section 13 connects the computing units in a configuration of connections corresponding to the physical configuration number.

Computing section 13 does not store all entries of configuration information contained in an object code, but stores at least a part thereof. If computing section 13 has not stored an entry of configuration information corresponding to a status to which computing section 30 needs to advance the next time, rewriting section 160 rewrites the configuration information.

Status management section 14 is a management section that manages a status transition of computing section 13 according to an object code. Status management section 14 decides a status to which computing section 30 needs to advance the next time according to the object code or the current status. Then, status management section 14 designates a physical configuration number corresponding to the status to which computing section 13 needs to advance the next time for computing section 13 and outputs a logical status number that uniquely identifies the status to which computing section 13 needs to advance the next time in the object code to determination section 15.

For example, although status management section 14 has stored a physical status transition table that correlates a physical status number of the current status, a physical configuration number and a logical status number corresponding to the status to which computing section 13 needs to advance the next time, the physical status transition table having been generated from the object code, status management section 14 can decide a physical configuration number that is designated to computing section 13 and a logical status number that is output to determination section 15 based on the physical status transition table.

Determination section 15 determines whether or not computing section 13 has stored an entry of configuration information corresponding to the status to which computing section 13 needs to advance the next time based on the logical status number that is output from status management section 14. Various determination methods can be contemplated.

For example, a method in which information necessary to make the determination is stored in advance can be contemplated. In this example, status management section 14 may output a physical status number corresponding to the status to which computing section 13 needs to advance the next time along with a logical status number. Determination section 15 may store correlations of a physical status number and a logical status number with respect to the entry of configuration information stored in computing section 13 as a stored status number correlation table. Determination section 15 compares the logical status number corresponding to the physical status number that is output from status management section 14 with the logical status number that is output from status management section 14 based on the stored status number correlation table so as to determine whether or not the computing section has stored an entry of configuration information corresponding to the status to which computing section 13 needs to advance the next time. When these logical status numbers match, determination section 15 can determine that computing section 13 has stored an entry of configuration information corresponding to the status to which computing section 13 needs to advance the next time.

Alternatively, a method in which the determination is made by computation can be contemplated. In this example, status management section 14 may output a physical status number corresponding to the status to which computing section 13 needs to advance the next time along with a logical status number. Determination section 15 may compute a logical status number with respect to an entry of configuration information stored in computing section 13 based on the physical status number that is output from status management section 14. Determination section 15 compares the computed logical status number with the logical status number that is output from status management section 14 so as to determine whether or not the computing section has stored an entry of configuration information corresponding to the status to which computing section 13 needs to advance the next time.

Further alternatively, a combination of the method in which information necessary to make the determination is stored in advance and the method in which the determination is made by computation may be contemplated.

When determination section 15 determines that computing section 13 has not stored an entry of configuration information corresponding to the status to which computing section 13 needs to advance the next time, rewriting section 16 rewrites configuration information of computing section 13 such that computing section 13 stores the entry of configuration information and a physical configuration number corresponding thereto.

Depending on the determination result of determination section 15, computing section 13 immediately starts a process based on physical configuration information supplied from status management section 14 or before executing the process, rewriting section 16 rewrites configuration information stored in computing section 13. For example, when determination section 15 determines that the computing section has not stored an entry of configuration information corresponding to the status to which computing section 13 needs to advance the next time, determination section 15 temporarily stops computing section 13. Then, rewriting section 16 stores the entry of configuration information and a physical configuration number corresponding thereto to computing section 13 while determination section 15 temporarily stops computing section 13. Thus, the determination made by determination section 15 is preferably completed in as a shorter time as possible.

As described above, according to this exemplary embodiment, status management section 14 outputs both a physical configuration number and a logical status number corresponding to the status to which computing section 13 needs to advance the next time. Then, status management section 14 designates a physical configuration number corresponding to the status to which computing section 13 needs to advance the next time to computing section 13 and thereby when computing section 13 has stored necessary configuration information, computing section 13 can immediately execute the next process. In addition, since determination section 1 determines whether or not computing section 13 has stored an entry of configuration information corresponding to the status to which computing section 13 needs to advance the next time based on the logical status number supplied from status management section 14 and then if computing section 13 has not stored it, rewriting section 16 writes it, the parallel computing device according to this exemplary embodiment can use a large object code. As a result, according to this exemplary embodiment, a parallel computing device that can use a large object code and that operates at high speed can be provided.

Alternatively, an object code used for parallel computing device 10 according to this exemplary embodiment may be generated by an object code output device composed of an information processing device. In this case, object code output device 20 generates an object code that contains configuration information that represents configurations of connections of a plurality of computing units of parallel computing device 10 and various types of tables containing information that parallel computing device 10 uses to perform processes for individual sections.

For example, an object code needs to contain a logical/physical correlation table that correlates a logical status number just corresponding to an entry of configuration information with a physical configuration number that identifies an entry of configuration information in parallel computing device 10. In addition, rewriting section 16 needs to obtain a physical configuration number corresponding to a logical status number that just corresponds to an entry of configuration information stored to computing section 13 from the logical/physical correlation table.

(Second Exemplary Embodiment)

A second exemplary embodiment exemplifies a more specific parallel computing device.

Figure 2:
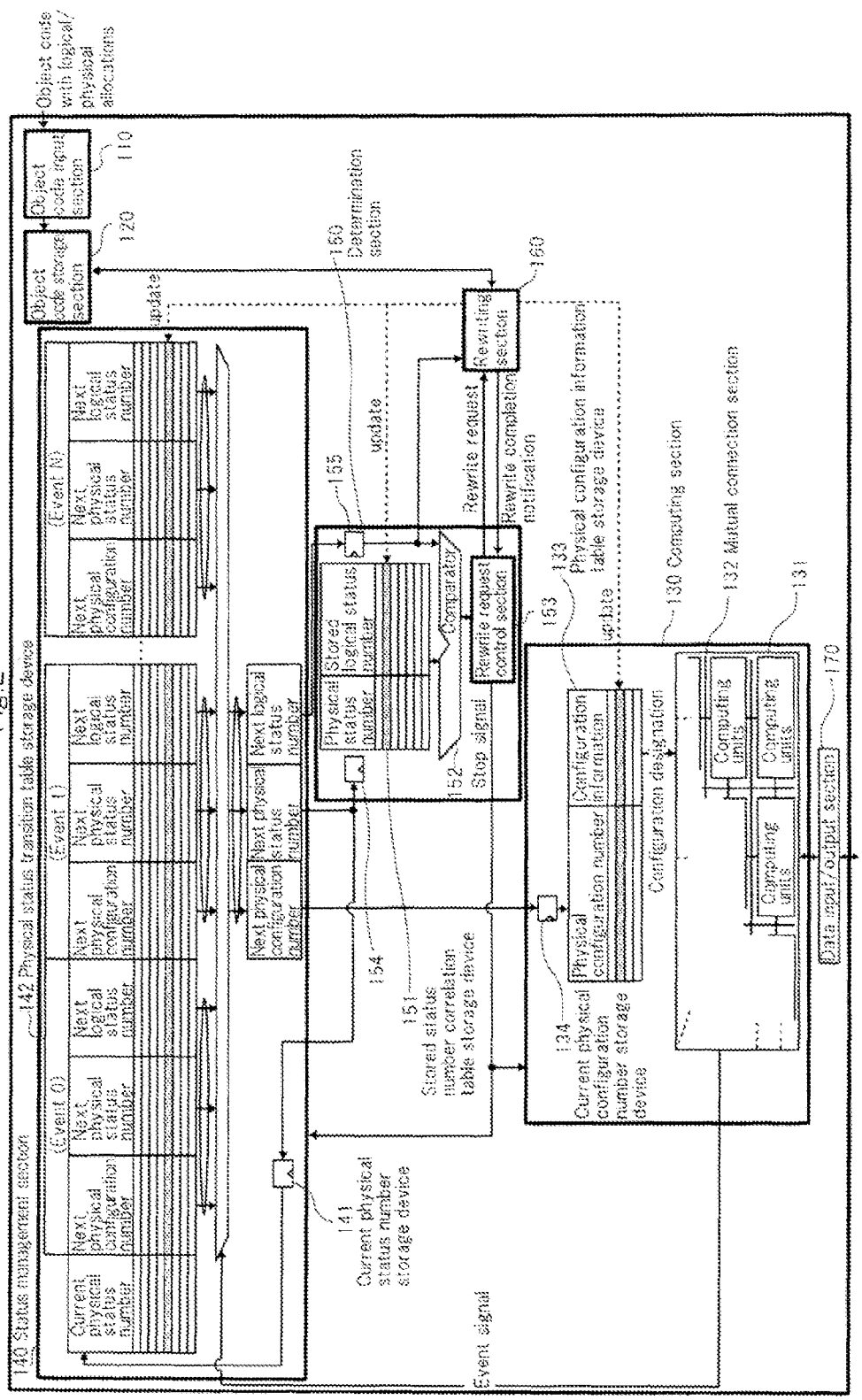
[FIG. 2] is a block diagram showing a structure of a parallel computation device according to a second exemplary embodiment.

FIG. 2 is a block diagram showing an exemplified structure of a parallel computing device according to the second exemplary embodiment. As shown in FIG. 2, parallel computing device 100 is provided with object code input section 110, object code storage section 120, computing section 130, status management section 140, determination section 150, rewriting section 160, and data input/output section 170.

Object code input section 110 accepts an object code with logical/physical allocations that is necessary to operate the parallel computing device from the outside. Object code storage section 120 stores the input object code with logical/physical allocations.

Status management section 140 designates the configuration of computing section 130 at each clock cycle. Computing section 130 configures a desired circuit at each clock cycle so as to execute a process. When computing section 130 executes a process, data input/output section 170 outputs processed data to an external circuit (not shown) or inputs processed data from an external circuit.

Determination section 150 determines whether or not computing section 130 has stored an entry of configuration information necessary to configure a desired circuit. When determination section 150 determines that computing section 130 has not stored the necessary entry of configuration information, rewriting section 160 fetches the necessary entry of configuration information from object code storage section 120 and rewrites the configuration information of computing section 130.

Figure 3:
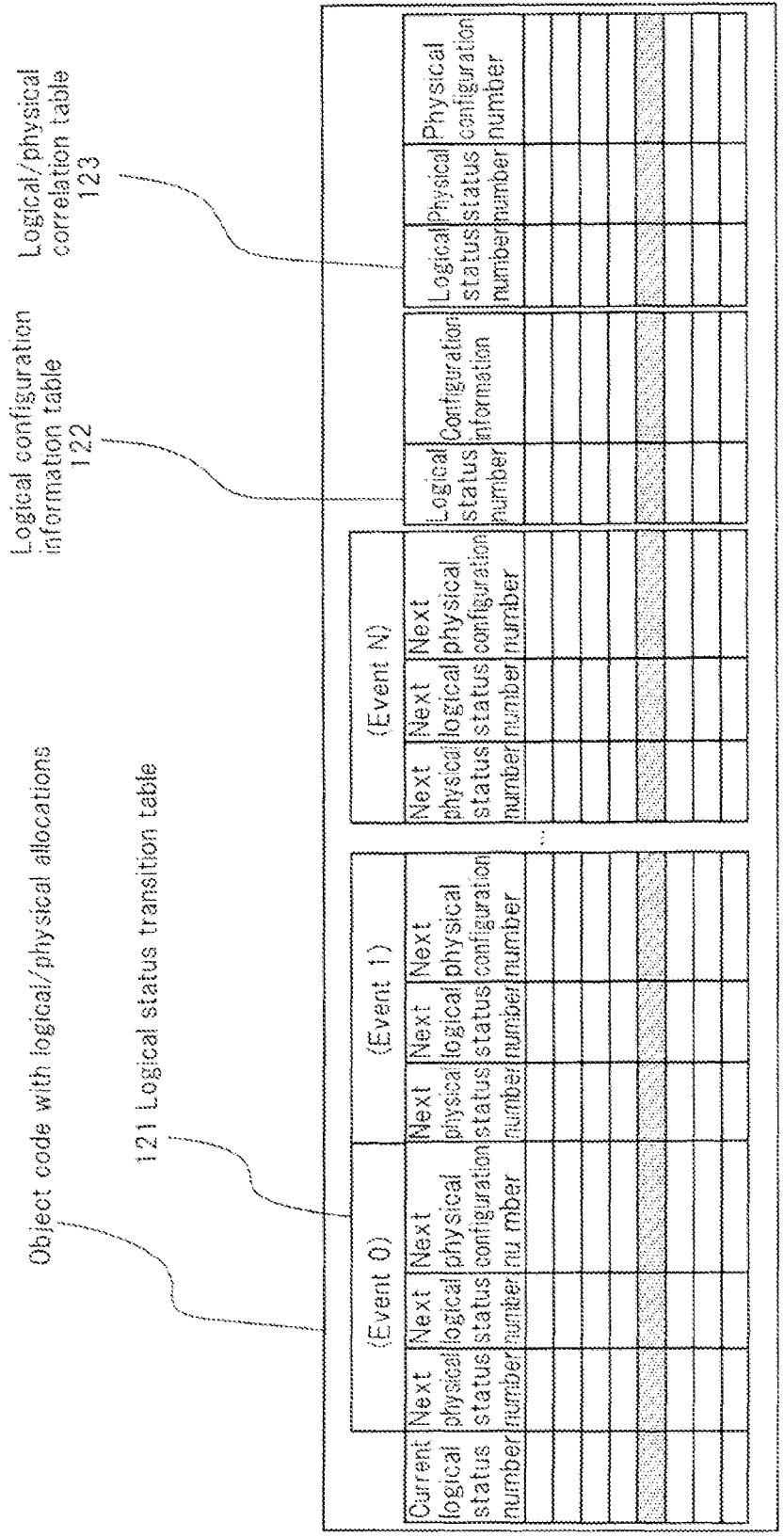
[FIG. 3] is a diagram showing an example of the substance of an object code with logical/physical allocations.

An object code with logical/physical allocations that object code storage section 120 stores is information based on which parallel computing device 100 performs an intended operation. FIG. 3 is a diagram showing an example of the substance of an object code with logical/physical allocations. Referring to FIG. 3, an object code with logical/physical allocations is composed of logical status transition table 121, logical configuration information table 122, and logical/physical correlation table 123.

Logical status transition table 121 is a table that correlates a current logical status number with a next logical status number, a next physical status number, and a next physical configuration number corresponding to each event. The current logical status number is a number that globally represents the current operation status. In this context, "globally" means "in the entire object code." The next logical status number is a number that globally represents the next operation status. The next physical status number is a number that uniquely corresponds to the next logical status number in the physical configuration information table of computing section 130. The next physical configuration number is a number that uniquely corresponds to the next logical status number in the physical configuration information table of computing section 130.

Logical configuration information table 122 is a table that represents an entry of configuration information corresponding to a logical status number used in logical status transition table 121.

Logical/physical correlation table 123 is a table that represents a physical status number and a physical configuration number corresponding to a logical status number used in logical status transition table 121.

Next, each section will be described in detail.

Computing section 130 has a plurality of computing units 131, mutual connection section 132 that changes connections of computing units 131, physical configuration information table storage device 133, and current physical configuration number storage device 134.

Physical configuration information table storage device 133 stores the physical configuration information table. The physical configuration information table designates at least one entry of configuration information, the entry containing a computation instruction for computing units 131 and connection information of mutual connection section 132, as a configuration number supplied from current physical configuration number storage device 134.

Current physical configuration number storage device 134 stores a physical configuration number that locally represents the current operation status of parallel computing device 100. In this context, "locally" means "in computing section 130."

Then, computing section 130 causes computing units 131 and mutual connection section 132 to accomplish a desired circuit at each clock cycle, executes a computation, and outputs an event signal that represents the computation result to status management section 140.

Status management section 140 has current physical status number storage device 141 and physical status transition table storage device 142.

Current physical status number storage device 141 stores the current operation status of parallel computing device 100 as a local status number (physical status number).

Physical status transition table storage device 142 stores a physical status transition table. The physical status transition table outputs a next logical status number that globally represents the next operation status, a next physical status number that uniquely corresponds to the next logical status number, and a next physical configuration number that designates an entry of configuration information that uniquely corresponds to the next logical status number based on the physical status number supplied from current physical status number storage device 141 and the event signal number supplied from computing section 130.

Status management section 140 operates at each clock cycle. At each clock cycle, status management section 140 generates a next logical status number, a next physical status number, and a next physical configuration number based on an event signal supplied from computing section 130. In addition, status management section 140 updates the substance of current physical status number storage device 141 with the next physical status number and then the substance of current physical configuration number storage device 134 with the next physical configuration number. Moreover, status management section 140 outputs the next physical status number and the next logical status number to determination section 150.

Determination section 150 is provided with stored status number correlation table storage device 151, comparator 152, rewrite request control section 153, and registers 154, 155 that delay the timing of the operation of comparator 152 by one clock cycle.

Stored status number correlation table storage device 151 stores a set of a physical status numbers that represents an entry of configuration information that physical configuration information table storage device 133 of computing section 130 is currently storing and a logical status number corresponding thereto.

Comparator 152 determines whether or not the physical status number and logical status number supplied from status management section 140 are present in stored status number correlation table storage device 151.

When comparator 152 determines that these status numbers are not present, rewrite request control section 153 issues the absent logical status number and a rewrite request to rewriting section 160. In addition, rewrite request control section 153 temporarily stops the operations of computing section 130 and status management section 140 until rewriting section 160 has issued a rewrite completion notification.

Rewriting section 160 rewrites a part of physical status transition table storage device 142, a part of physical configuration information table storage device 133, and a part of stored status number correlation table storage device 151 according to the following steps (1) to (4) based on the rewrite request and logical status number supplied from determination section 150.

(1) Referring to logical/physical correlation table 123 stored in object code storage section 120, rewriting section 160 obtains a physical status number and a physical configuration number based on the input logical status number.

(2) Rewriting section 160 obtains status transition information corresponding to the input logical status number from logical status transition table 121 stored in object code storage section 120 and updates an entry of physical status transition table storage device 142 corresponding to the physical status number obtained at step (1). The status transition information corresponding to the logical status number is information that represents a status transition including the status corresponding to the logical status number.

(3) Rewriting section 160 obtains an entry of configuration information corresponding to the input logical status number from logical configuration information table 122 stored in object code storage section 120 and updates an entry of physical configuration information table storage device 133 corresponding to the physical configuration number obtained at step (1).

(4) Rewriting section 160 updates an entry of stored status number correlation table storage device 151 with the set of the input logical status number and the physical status number obtained at step (1).

(Third Exemplary Embodiment)

A third exemplary embodiment exemplifies an information processing system including parallel computing device 100.

Figure 4:
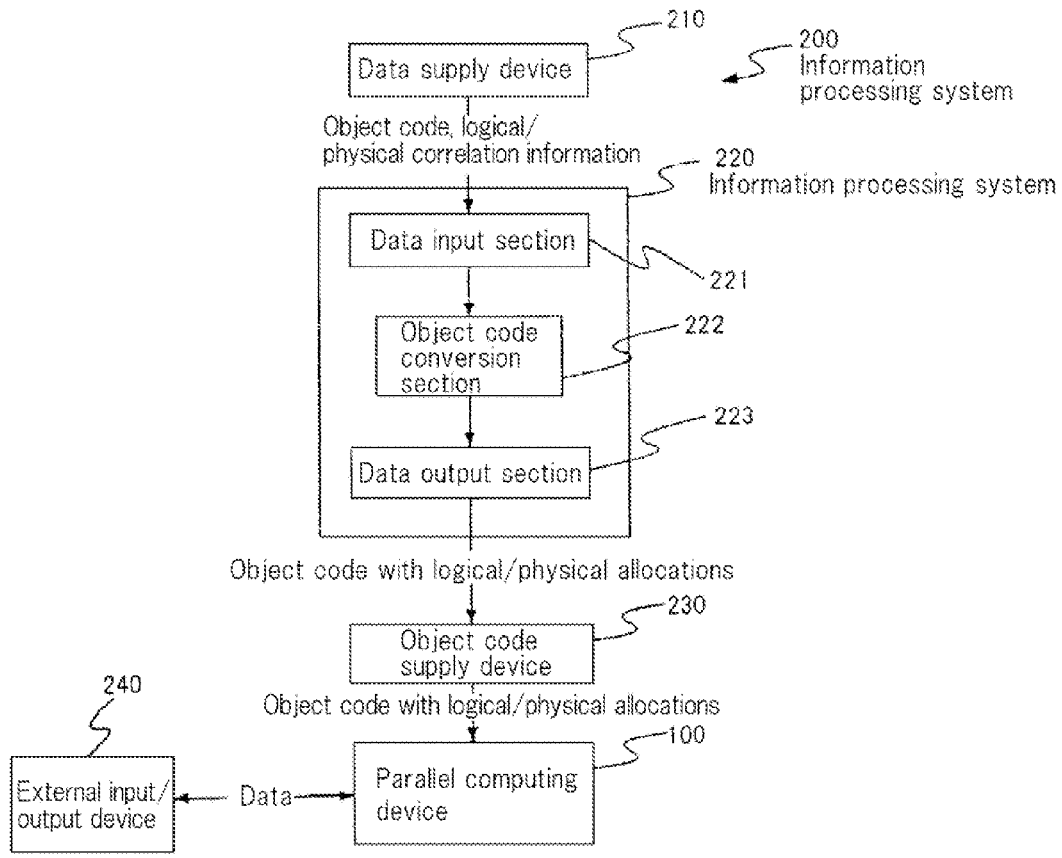
[FIG. 4] is a block diagram showing an exemplified structure of an information processing system according to a third exemplary embodiment.

FIG. 4 is a block diagram showing an exemplified structure of the information processing system according to the third exemplary embodiment. As shown in FIG. 4, information processing system 200 is provided with data supply device 210, information processing device 220, object code supply device 230, parallel computing device 100, and external input/output device 240. Parallel computing device 100 is the same as that of the second exemplary embodiment.

Information processing device 220 is provided with data input section 221, object code conversion section 222, and data output section 223.

Data input section 221 accepts data from the outside. In this example, an object code without logical/physical allocations and logical/physical correlation information are input. An object code without logical/physical allocations is an object code that is a source of an object code with logical/physical allocations shown in FIG. 3. In other words, information processing device 220 according to this exemplary embodiment is a device that converts an object code without logical/physical allocations into an object code with logical/physical allocations.

Specifically, an object code without logical/physical allocations is an object code generated according to the second related art. The object code without logical/physical allocations is composed of a status transition table stored in the status management section of the parallel computing device according to the first related art and a configuration information table stored in the computing section of the parallel computing device according to the first related art.

Object code conversion section 222 generates an object code with logical/physical allocations from the object code without logical/physical allocations and logical/physical correlation information that are input to data input section 221.

Specifically, a configuration number correlation table, a configuration information table, and a status transition table are input to data input section 221. The configuration number correlation table correlates status numbers that represent statuses of parallel computing device 100 with configuration numbers that represent configurations of computing section 130. The configuration information table correlates configuration numbers with entries of configuration information that represent configurations of computing section 130 corresponding to the configuration numbers. The status transition table correlates a current status number with at least a next configuration number.

Object code conversion section 222 designates a logical status number that uniquely identifies a physical status number as the input status number. In addition, object code conversion section 222 designates a logical configuration number that uniquely identifies a physical configuration number as the input configuration number. Then, object code conversion section 222 generates a logical configuration information table that correlates logical status numbers with entries of configuration information, a logical/physical correlation table that correlates logical status numbers with at least physical configuration numbers, and an object code with logical/physical allocations that correlates a current logical status number with at least a next physical configuration number and a logical status number.

Data output section 223 outputs the object code with logical/physical allocations and so forth generated by object code conversion section 222 to the outside.

Figure 5:
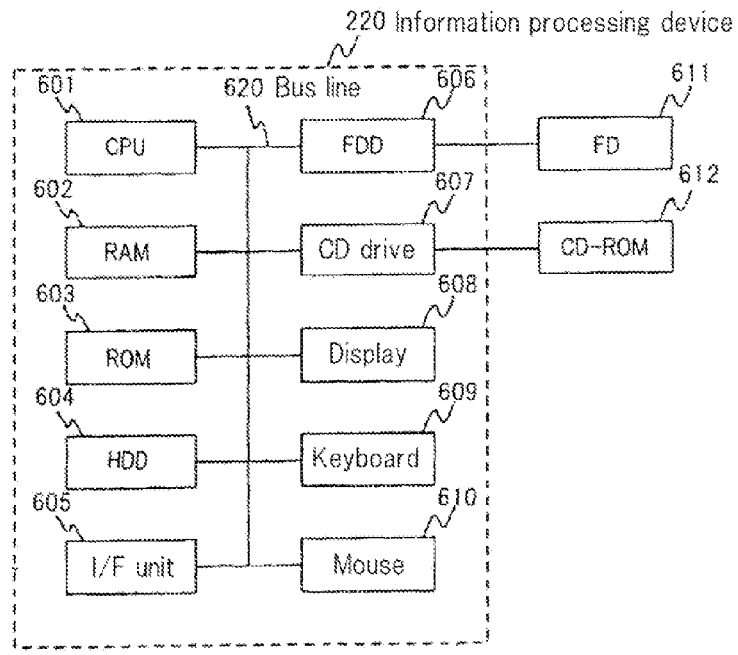
[FIG. 5] is a schematic diagram showing an exemplified structure of hardware of information processing device 220.

FIG. 5 is a schematic diagram showing an exemplified structure of hardware of information processing device 220. Information processing device 220 can be realized by a computer that is provided with CPU 601; RAM 602, ROM 603, HDD 604, FDD (FD Drive) 606 to which FD 611 can be loaded, CD drive 607 to which CD-ROM 612 can be loaded, display 608, keyboard 609, mouse 610, I/F unit 605, and so forth that are connected to CPU 601 through bus line 620.

In information processing device 220 shown in FIG. 5, RAM 602, ROM 603, HDD 604, FD 611, CD-ROM 612, and so forth correspond to storage mediums and a program that CPU 601 executes and various types of data are stored in at least one of these storage mediums.

For example, a program that causes CPU 601 to execute various types of processes has been originally stored in a storage medium such as FD 611 or CD-ROM 612. Before the program is executed, it is installed in HDD 604 and when information processing device 220 is activated, the program is copied to RAM 602 and then read to CPU 601.

When CPU 601 reads the program and executes various types of processes according to the program, information processing device 220 according to this exemplary embodiment operates as data input section 221, object code conversion section 222, and data output section 223 shown in FIG. 4.

Data supply device 210 is for example FD 611 that has stored for example an object code without logical/physical allocations and logical/physical correlation information and supplies these types of data to information processing device 220.

Data input section 221 of information processing device 220 is realized by causing CPU 601 to control FDD 606 according to the program stored in RAM 602. Data input section 221 obtains the object code without logical/physical allocations and logical/physical correlation information stored in data supply device 210.

Object code conversion section 222 is realized by causing CPU 601 to execute a process according to the program. Object code conversion section 222 converts the object code without logical/physical allocations and logical/physical correlation information obtained from data input section 121 into an object code with logical/physical allocations.

Data output section 223 is realized by causing CPU 601 to control a data output of I/F unit 605 according to the program. Data output section 223 outputs the object code with logical/physical allocations obtained from object code conversion section 222 to object code supply device 230.

Object code supply device 230 corresponds to a connector (not shown) or the like that connects I/F unit 605 of data output section 223 and parallel computing device 100 and supplies the object code with logical/physical allocations that is output from information processing device 220 to parallel computing device 100.

The logical/physical correlation information that is input to information processing device 220 according to this exemplary embodiment is information that uniquely correlates a logical status number that is a status number of the object code without logical/physical allocations with a physical status number that represents an entry number stored in physical status transition table storage device 142 of parallel computing device 100 and a physical configuration number that represents an entry number stored in physical configuration information table storage device 133.

Object code conversion section 222 converts an object code without logical/physical allocations and logical/physical correlation information into an object code with logical/physical allocations according to the following steps (1) and (2).

(1) Referring to the logical/physical correlation information, object code conversion section 222 adds next physical status numbers corresponding to logical status numbers to the transition destinations of all event signals of entries of individual logical status numbers on the status transition table of the object code without logical/physical allocations.

(2) Referring to the logical/physical correlation information, object code conversion section 222 adds next physical configuration numbers corresponding to logical status numbers to the transition destinations of all event signals of entries of individual logical status numbers on the status transition table of the object code without logical/physical allocations.

(Fourth Exemplary Embodiment)

A fourth exemplary embodiment exemplifies a parallel computing device that performs a computation so as to determine whether or not an entry of configuration information corresponding to a status to which computing section 30 needs to advance the next time has been stored. The parallel computing device according to the fourth exemplary embodiment is different from the parallel computing device according to the second exemplary embodiment in that a determination section corresponding to determination section 150 according to the first exemplary embodiment performs a computation so as to makes the determination.

Figure 6:
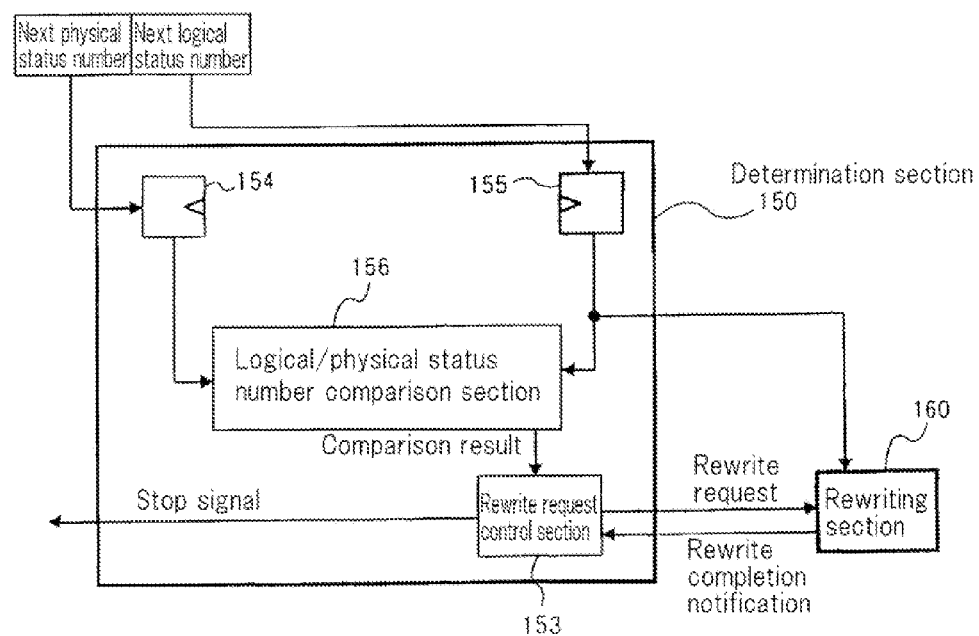
[FIG. 6] is a block diagram showing a structure of determination section 150' of a parallel computation device according to a fourth exemplary embodiment.

FIG. 6 is a block diagram showing a structure of determination section 150' of the parallel computing device according to the fourth exemplary embodiment. Referring to FIG. 6, determination section 150' is provided with logical/physical status number comparison section 156 instead of stored status number correlation table storage device 151 and comparator 152 shown in FIG. 2.

In this exemplary embodiment, it is assumed that a physical status number is obtained by performing a predetermined computation for a logical status number in an object code with logical/physical allocations. The predetermined computation is not limited, that is, four-rule computations, bit shift, logical OR, logical AND, logical NOT, or any combination thereof.

Logical/physical status number comparison section 156 is given a logical status number and a physical status number from status management section 140 and compares the physical status number obtained by performing the predetermined computation for the given logical status number with the given physical status number. The comparison result becomes the determination result of whether or not an entry of configuration information corresponding to the physical status number has been stored in computing section 130. Logical/physical status number comparison section 156 outputs the comparison result to rewrite request control section 153.

EXAMPLES

Examples of information processing device 220 and parallel computing device 100 of the information processing system according to the third exemplary embodiment will be described.

FIG. 7 is a diagram showing an example of an object code without logical/physical allocations supplied from object code storage section 120. FIG. 8 is a schematic diagram showing a status transition in the object code without logical/physical allocations shown in FIG. 7. FIG. 9 is a diagram showing an example of logical/physical correlation information supplied from data supply device 210.

As shown in FIG. 7, an object code without logical/physical allocations is composed of a status transition table, a configuration number correlation table, and a configuration information table. In addition, as shown in FIG. 9, the logical/physical correlation information is composed of logical/physical status number correlation information and logical/physical configuration number correlation information.

Information processing device 220 generates a logical status transition table and a logical/physical correlation table of an object code with logical/physical allocations from the object code without logical/physical allocations and logical/physical correlation information. FIG. 10A is a diagram showing the logical/physical status transition table of the object code with logical/physical allocations. FIG. 10B is a diagram showing the logical/physical correlation table of the object code with logical/physical allocations.

Information processing device 220 generates entries of current logical status number 0 on the logical status transition table shown in FIG. 10A according to the following steps (1) to (3).

(1) The next status number corresponding to current status number 0 and event 0 on the status transition table of the object code without logical/physical allocations is 1. Thus, information processing device 220 sets 1 for the next logical status number corresponding to current logical status number 0 and event 0 on the logical status transition table.

(2) The next status number corresponding to current status number 0 and event 0 on the status transition table of the object code without logical/physical allocations is 1, whereas the physical status number corresponding to logical status number 1 of the logical/physical status number correlation information is 1. Thus, information processing device 220 sets 1 for the next physical status number corresponding to current logical status number 0 and event 0 on the logical status transition table.

(3) The next configuration number corresponding to current status number 0 and event 0 on the status transition table of the object code without logical/physical allocations is 0, whereas the physical configuration number corresponding to logical configuration number 0 of the logical/physical construction number correlation information is 0. Thus, information processing device 220 sets 0 for the next physical configuration number corresponding to current logical status number 0 and event 0 on the logical status transition table.

By performing the foregoing steps for all entries of the current logical status numbers and the event numbers, the logical status transition table is generated.

Information processing device 220 generates entries of logical status number I on the logical/physical correlation table shown in FIG. 10B according to steps (1) to (2) that follow.

(1) The physical status number corresponding to logical status number 1 of the logical/physical status number correlation information is 1. Thus, information processing device 220 sets 1 for the physical status number corresponding to logical status number 1 on the logical/physical correlation table.

(2) The configuration number corresponding to current status number 1 on the configuration number correlation table of the object code without logical/physical allocations is 0, whereas the physical configuration number corresponding to logical configuration number 0 of the logical/physical configuration number correlation information is 0. Thus, information processing device 220 sets 0 for the physical configuration number corresponding to logical status number 1 on the logical/physical correlation table.

By performing the foregoing steps for all entries of the logical status numbers, the logical/physical correlation table is generated.

The object code with logical/physical allocations executed on parallel computing device 100 is composed of the logical status transition table and logical/physical correlation table that are generated as described above and the logical configuration information table contained in the object code without logical/physical allocations.

Next, how parallel computing device 100 executes an object code with logical/physical allocations will be described.

FIG. 11 is a schematic diagram showing a status of parallel computing device 100 immediately after the execution from logical status 0 to logical status 1 of the object code with logical/physical allocations shown in FIG. 10B. It is assumed that computing section 130 outputs event 0.

Object code storage section 120 has stored the entire object code with logical/physical allocations.

Stored status number correlation table storage device 151 has stored logical status numbers 0 and 1 and also physical status numbers 0 and 1 corresponding thereto.

Physical status transition table storage device 142 has stored entries corresponding to physical status numbers 0 and 1.

Physical configuration information table storage device 133 has stored an entry corresponding to physical configuration number 0.

As described above, since logical statuses 0 and 1 have been just executed in FIG. 11, current physical status number storage device 141 has stored 1 and current physical configuration number storage device 134 has stored 0.

At this point, the next logical status number, next physical status number, and next physical configuration number that are output from status management section 140 are 2, 0, and 0, respectively. Thus, at the next clock cycle, current physical status number storage device 141 and current physical configuration number storage device 134 are updated to 0 and 0, respectively.

FIG. 12 is a schematic diagram showing a status of parallel computing device 100 at the next clock cycle of FIG. 11. Current physical status number storage device 141 shown in FIG. 12 has stored 0, whereas current physical configuration number storage device 134 has stored 0. Thus, computing units 131 and mutual connection section 132 constructs a circuit for computation A and executes its computation.

However, because an entry corresponding to physical status number 0 on the stored status number table storage device of determination section 150 is 0, which is different from logical status number 2 stored in storage device 155, comparator 152 outputs a mismatch. When the mismatch is input to rewrite request control section 153, it outputs a stop signal to computing section 130 and status management section 140, causing them to temporarily stop the computation and status transition, and also outputs a rewrite request along with logical status number 2 where a mismatch occurs to rewriting section 160.

Rewriting section 160 receives the rewrite request and logical status number 2 and obtains entries corresponding to current logical status number 2 from logical status transition table 121 stored in object code storage section 120. Thereafter, referring to logical/physical correlation table 123 stored in object code storage section 120, rewriting section 160 obtains physical status number 0 corresponding to logical status number 2 and overwrites the obtained entries to those corresponding to current physical status number 0 of physical status transition table storage device 142.

In addition, rewriting section 160 obtains an entry of configuration information corresponding to logical status number 2 on logical configuration information table 122 stored in object code storage section 120. Thereafter, referring to the logical/physical correlation table stored in object code storage section 120, rewriting section 160 obtains physical configuration number 0 corresponding to logical status number 2 and overwrites the obtained configuration information to the entry of configuration information corresponding to physical configuration number 0 of physical configuration information table storage device 133.

Moreover, referring to logical/physical correlation table 123 stored in object code storage section 120, rewriting section 160 obtains physical status number 0 corresponding to logical status number 2 and overwrites 2 to the logical status number corresponding to physical status number 0 of stored status number correlation table storage device 151.

After physical status transition table storage device 142, physical configuration information table storage device 133, and stored status number correlation table storage device 151 have been rewritten, rewriting section 160 sends a rewrite completion notification to rewrite request control section 153.

When rewrite request control section 153 receives the rewrite completion notification, rewrite request control section 153 invalidates the stop signal that is output to computing section 130 and status management section 140 so as to restore the computation and the status transition of parallel computing device 100.

FIG. 13 is a schematic diagram showing a status of parallel computing device 100 after rewriting section 160 has operated. In FIG. 13, hatched entries are those that are referenced and updated. In this case, since the substance of physical configuration information table storage device 133 does not change after it is updated, physical configuration information table storage device 133 does not always need to be overwritten.

By repeating the foregoing operation, parallel computing device 100 successively executes object codes with logical physical allocations stored in object code storage section 120.

Figure 14:
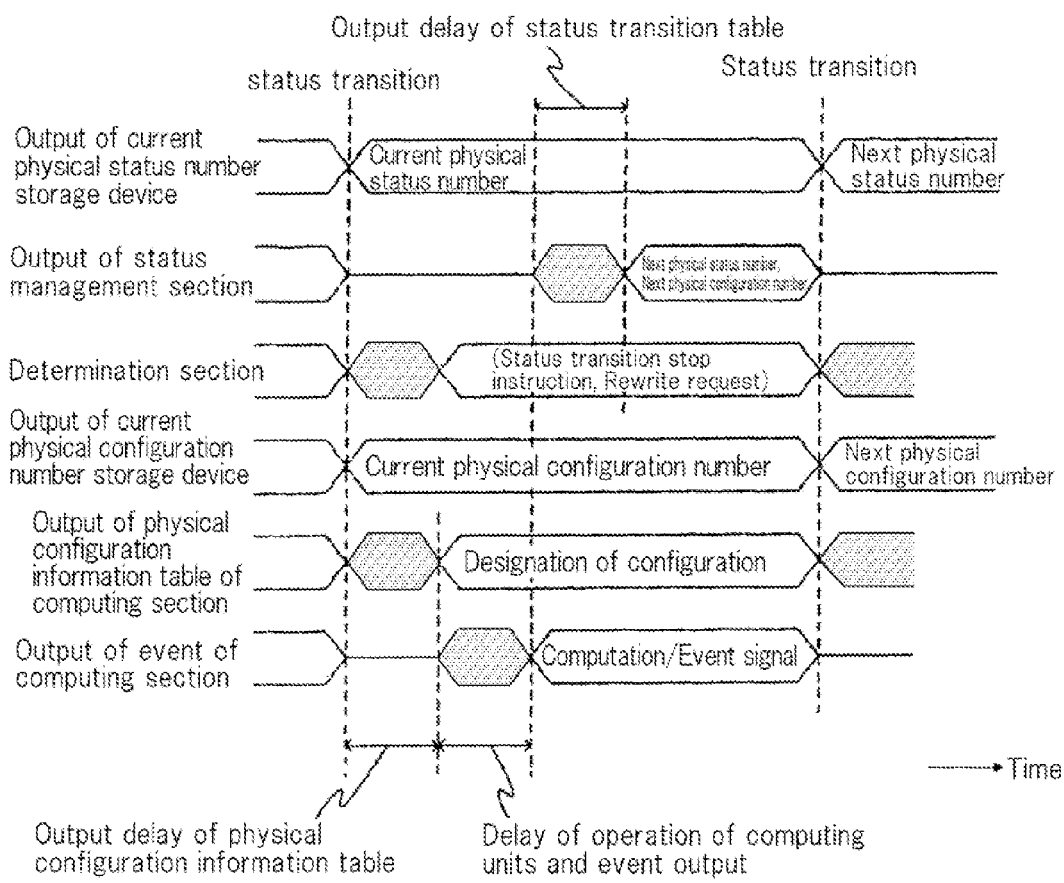
[FIG. 14] is a timing chart showing the operation of parallel computation device 100 according to this exemplary embodiment.

FIG. 14 is a timing chart showing the operation of parallel computing device 100 according to this example of the third exemplary embodiment.

When a status transition occurs in parallel computing device 100, the current physical status number stored in current physical status number storage device 141 and the current physical configuration number stored in current physical configuration number storage device 134 are updated.

Physical configuration information table storage device 133 outputs an entry of configuration information corresponding to the current physical status number to computing units 131 and mutual connection section 132. Computing units 131 and mutual connection section 132 construct a circuit based on the input entry of configuration information, perform a computation through the circuit, and output an event signal that is a part of the computation result to status management section 140.

Status management section 140 outputs a next physical status number and a next physical configuration number based on the input event signal and current physical status number. They correspond to a status to which parallel computing device 100 needs to advance at the next clock cycle.

At this point, if the physical status number and logical status number stored at the immediately preceding clock cycle do not match those stored in stored status number correlation table storage device 151, determination section 150 causes parallel computing device 100 to stop its computation and status transition.

As described above, parallel computing device 100 according to each of the foregoing exemplary embodiments can indirectly designate a physical configuration number as a logical configuration number based on logical/physical correlation information. Thus, even if a plurality of object codes are installed in parallel computing device 100, physical configuration numbers do not overlap. In addition, a plurality of object codes does not need to be converted into one object code such that their configuration numbers do not overlap.

In addition, because a physical configuration number can be indirectly designated as a logical configuration number for parallel computing device 100 according to each of the exemplary embodiments, parallel computing device 100 can execute a large object code that exceeds entries of configuration information that parallel computing device 100 can store.

Moreover, since determination section 150 determines whether or not logical status numbers match by referring to a relevant table, a structure in which a logical number is converted into a physical number using a special memory such as a CAM is not required and thereby the circuit scale and the operation delay can be further decreased.

Furthermore, since determination section 150 in parallel computing device 100 according to the third exemplary embodiment performs a computation to determine whether or not logical status numbers match, the circuit scale and operation delay can be decreased.

In addition, information processing system 200 according to each of the exemplary embodiments, by adding logical/physical correlation information to an object code without logical/physical allocations, can generate an object code with logical/physical allocations that causes parallel computing device 100 to effectively operate.

Structures of individual sections of the data processing system according to the present invention are not limited as long as their functions can be accomplished. For example, dedicated hardware that realizes a predetermined function, a data processing device that realizes a predetermined function by executing a process according to a program, a predetermined function that is realized in a data processing device by a program, and combinations thereof can be permitted. In addition, individual sections that the data processing system according to the present invention provides do not need to be independent substances and thereby one section may be a part of another section.

Now, with reference to the exemplary embodiments, the present invention has been described. However, it should be understood by those skilled in the art that the structure and details of the present invention may be changed in various manners without departing from the scope of the present invention.

The invention claimed is:
1. A parallel computing device that executes a process based on an object code that contains configuration information generated based on data to be processed and that configures a circuit corresponding to configuration information, said parallel computing device comprising:
   an object code storage section that includes a logical configuration information table, a logical/physical correlation table and a logical status transition table,
   said logical configuration information table correlatively storing a status number, that represents a status that is being executed based on configuration information as a logical status number that uniquely identifies the status in said object code, with the entry of each configuration information,
   said logical/physical correlation table correlatively storing the logical status number with a physical status number that is a status number that uniquely identifies the status number in said parallel computing device and a physical configuration number that uniquely identifies configuration information in said parallel computing device,
   said logical status transition table that represents a transition of logical status;
   a computing section that includes a plurality of computing units and a physical configuration information table that correlatively stores a part of configuration information in said object code with the physical configuration number that uniquely identifies the configuration information,
   said computing section executing a process to change connections of said computing units based on configuration information that identifies said physical configuration information, and outputting an event signal that represents the computation result at each clock cycle;
   a status management section that includes a physical status transition table that contains a next physical status number and a next physical configuration number corresponding to a next logical status number, and that outputs the next physical configuration number, the next physical status number and the next logical status number,
   said physical status transition table correlatively storing the physical status number that is generated based on said object code corresponding to configuration information that is currently being executed with the next logical status number that is the logical status number to which said computing section needs to transit at the next clock cycle, the next logical status number being determined based on the event signal and the physical status number;
   a determination section that correlatively holds a physical status number corresponding to the entered configuration information stored in said computing section with a logical status number corresponding to the physical status number, that determines that said computing section has not stored the entered configuration information corresponding to the next status to which said computing section needs to transit if a next logical status number that is output from said status management section does not match the logical status number corresponding to the physical status number that is stored in said computing section, and that outputs the next logical status number with a rewriting instruction; and
   a rewriting section that refers to said logical/physical correlation table and said logical status transition table of said object code storage section based on a next logical status number output from said determination section, and that updates information that represents a status transition stored in said physical status transition table of said status management section, the logical status number being held by said determination section and configuration information stored in said physical configuration information table of said computing section based on the physical status number corresponding to the next logical status number output from said determination section.

2. The parallel computing device according to claim 1, wherein said determination section includes a stored status number correlation table that correlatively stores the physical status number corresponding to configuration information stored in said computing section and the logical status number corresponding to said physical status number, and determines that said computing section has not stored the entered configuration information corresponding to the next status to which said computing section needs to transit if the logical status number stored in said stored status number correlation table corresponding to the next physical status number that is output from said status management section does not match the next logical status number that is output from said status management section.

3. The parallel computing device according to claim 2, when the physical status number is obtained by performing a predetermined computation for the logical status number in said object code,
said determination section includes a logical/physical status number comparison section that computes the physical status number by performing the predetermined computation based on the next logical status number that is output from said status management section and that compares the computed physical status number with the next physical status number that is output from said status management section, and
said determination section determines that said computing section has not stored the entered configuration information corresponding to the next status to which said computing section needs to transit if the comparison result of said logical/physical status number comparison section is a mismatch.

4. An information processing system that comprises a parallel computing device that executes a process based on an object code which contains configuration information generated based on data to be processed and that configures a circuit corresponding to configuration information, and an information processing device that generates said object code that is provided with said parallel computing device,
wherein said information processing device comprises an object code conversion section that generates an object code with logical/physical allocations based on an object code without logical/physical allocations and a logical/physical correlation information which are externally input and that outputs said object code with logical/physical allocations, said object code without logical/physical allocation containing a
configuration number correlation table that correlatively stores a configuration number that identifies configuration information with a status number that represents a status of said parallel computing device corresponding to configuration information, a configuration information table that correlatively stores the configuration number with configuration information, and a status transition table that correlatively stores the status number that is being executed with a next configuration number,
said object code with logical/physical allocations containing a logical configuration information table that correlatively stores a logical status number with configuration information, a logical/physical correlation table that correlatively stores the logical status number with a physical status number and a physical configuration number, and a logical status transition table that represents a transition of logical status,
said logical/physical correlation information correlatively representing logical information, that is uniquely identified in said object code without logical/physical allocation, with a physical information that is uniquely identified in said parallel computing device,
wherein said parallel computing device comprises:
an object code storage section that stores said logical configuration information table, said logical/physical correlation table and said logical status transition table included in said object code with logical/physical allocations;
a computing section that includes a plurality of computing units and a physical configuration information table that correlatively stores a part of configuration information in said object code with logical/physical allocations with the physical configuration number that uniquely identifies the configuration information,
said computing section executing a process to change connections of said computing units based on configuration information that identifies said physical configuration information, and outputting an event signal that represents the computation result at each clock cycle;
a status management section that includes a physical status transition table that contains a next physical status number and a next physical configuration number corresponding to a next logical status number, and that outputs the next physical configuration number, the next physical status number and the next logical status number,
said physical status transition table correlatively storing the physical status number that is generated based on said object code with logical/physical allocations corresponding to configuration information that is currently being executed with the next logical status number that is the logical status number to which said computing section needs to transit at the next clock cycle, the next logical status number being determined based on the event signal and the physical status number;
a determination section that correlatively holds a physical status number corresponding to the entered configuration information stored in said computing section with a logical status number corresponding to the physical status number, that determines that said computing section has not stored the entered configuration information corresponding to the next status to which said computing section needs to transit if a next logical status number that is output from said status management section does not match the logical status number corresponding to the physical status number that is stored in said computing section, and that outputs the next logical status number with a rewriting instruction; and
a rewriting section that refers to said logical/physical correlation table and said logical status transition table of said object code storage section based on a next logical status number output from said determination section, and that updates information that represents a status transition stored in said physical status transition table of said status management section, the logical status number being held by said determination section and configuration information stored in said physical configuration information table of said computing section based on the physical status number corresponding to the next logical status number output from said determination section.

5. The information processing system according to claim 4, wherein said determination section includes a stored status number correlation table that correlatively stores the physical status number corresponding to configuration information stored in said computing section and the logical status number corresponding to said physical status number, and determines that said computing section has not stored the entered configuration information corresponding to the next status to which said computing section needs to transit if the logical status number stored in said stored status number correlation table corresponding to the next physical status number that is output from said status management section does not match the next logical status number that is output from said status management section.

6. The information processing system according to claim 4, when the physical status number is obtained by performing a predetermined computation for the logical status number in said object code with logical/physical allocations, said determination section includes a logical/physical status number comparison section that computes the physical status number by performing the predetermined computation based on the next logical status number that is output from said status management section and that compares the computed physical status number with the next physical status number that is output from said status management section, and said determination section determines that said computing section has not stored the entered configuration information corresponding to the next status to which said computing section needs to transit if the comparison result of said logical/physical status number comparison section is a mismatch.

7. A parallel computing method for a parallel computing device that executes a process based on an object code that contains configuration information generated based on data to be processed and that configures a circuit corresponding to configuration information, said parallel computing method comprising the steps of:

an object code storage step storing a logical configuration information table, a logical/physical correlation table and a logical status transition table, said logical configuration information table correlatively storing a status number, that represents a status that is being executed based on configuration information as a logical status number that uniquely identifies the status in said object code, with the entry of each configuration information, said logical/physical correlation table correlatively storing the logical status number with a physical status number that is a status number that uniquely identifies the status number in said parallel computing device and a physical configuration number that uniquely identifies configuration information in said parallel computing device, said logical status transition table representing a transition of logical status; a computing step correlatively storing a part of configuration information in said object code with the physical configuration number that uniquely identifies the configuration information in a physical configuration information table, and executing a process to change connections of said computing units based on configuration information that identifies said physical configuration information, and outputting an event signal that represents the computation result at each clock cycle;

a status management step generating a physical status transition table that contains a next physical status number and a next physical configuration number corresponding to a next logical status number, and outputting the next physical configuration number, the next physical status number and the next logical status number, said physical status transition table correlatively storing the physical status number that is generated based on said object code corresponding to configuration information that is currently being executed with the next logical status number that is the logical status number to which said computing section needs to transit at the next clock cycle, the next logical status number being determined based on the event signal and the physical status number;

a determination step correlatively holding a physical status number corresponding to the entered configuration information stored in said physical configuration information table by said computing step with a logical status number corresponding to the physical status number, that determines that said physical configuration information table has not stored the entered configuration information corresponding to the next status to which said computing units need to transit if a next logical status number that is output by said status management step does not match the logical status number corresponding to the physical status number that is stored in said physical configuration information table, and outputting the next logical status number with a rewriting instruction; and a rewriting step referring to said logical/physical correlation table and said logical status transition table stored by said object code storage step based on a next logical status number output by said determination step, and updating information that represents a status transition stored in said physical status transition table by said status management step, the logical status number being held by said determination step and configuration information stored in said physical configuration information table by said computing step based on the physical status number corresponding to the next logical status number output by said determination step.

8. The parallel computing method according to claim 7, wherein said determination step correlatively storing the physical status number corresponding to configuration information stored by said computing step and the logical status number corresponding to said physical status number in a stored status number correlation table, and determining that said physical configuration information table has not stored the entered configuration information corresponding to the next status to which said computing units need to transit if the logical status number stored in said stored status number correlation table corresponding to the next physical status number that is output by said status management step does not match the next logical status number that is output by said status management step.

9. The parallel computing method according to claim 7, when the physical status number is obtained by performing a predetermined computation for the logical status number in said object code, said determination step computing the physical status number by performing the predetermined computation based on the next logical status number that is output by said status management step, comparing the computed physical status number with the next physical status number that is output by said status management step, and determining that said physical configuration information table has not stored the entered configuration information corresponding to the next status to which said computing units need to transit if the comparison result is a mismatch.

\* \* \* \* \*